United States Patent
Thomas et al.

(10) Patent No.: US 9,175,792 B2
(45) Date of Patent: Nov. 3, 2015

(54) CABLE GUIDE

(75) Inventors: Elfed Thomas, Merseyside (GB); James Archibald McBride, Merseyside (GB)

(73) Assignee: FIBRE OPTIC SOLUTIONS LIMITED, Oswestry Shropshire (GB)

( * ) Notice: Subject to any disclaimer, the term of this patent is extended or adjusted under 35 U.S.C. 154(b) by 587 days.

(21) Appl. No.: 13/515,046

(22) PCT Filed: Dec. 13, 2010

(86) PCT No.: PCT/GB2010/052077
§ 371 (c)(1),
(2), (4) Date: Jan. 18, 2013

(87) PCT Pub. No.: WO2011/070377
PCT Pub. Date: Jun. 16, 2011

(65) Prior Publication Data
US 2013/0105024 A1    May 2, 2013

(30) Foreign Application Priority Data
Dec. 11, 2009 (GB) .................... 0921716.7

(51) Int. Cl.
*H02G 3/04* (2006.01)
*F16L 7/00* (2006.01)
*G02B 6/44* (2006.01)
*H02G 1/08* (2006.01)
*H02G 9/06* (2006.01)

(52) U.S. Cl.
CPC ............... *F16L 7/00* (2013.01); *G02B 6/4459* (2013.01); *H02G 1/08* (2013.01); *H02G 9/06* (2013.01)

(58) Field of Classification Search
CPC .......... H02G 1/083; H02G 1/086; H02G 1/08
USPC ................... 254/134.3 R, 134.3 FT
See application file for complete search history.

(56) References Cited

U.S. PATENT DOCUMENTS

| 4,529,009 | A | | 7/1985 | Horner et al. |
| 5,431,370 | A | * | 7/1995 | Verkuylen et al. ... 254/134.3 FT |

(Continued)

FOREIGN PATENT DOCUMENTS

| DE | 2970570 U1 | 1/1998 |
| EP | 0725466 A1 | 8/1996 |

(Continued)

OTHER PUBLICATIONS

IPO Search Report under Section 17 for Appl. No. GB1021098.7, Mar. 16, 2011 pp. 1-4.

*Primary Examiner* — Lee D Wilson
(74) *Attorney, Agent, or Firm* — Barlow, Josephs & Holmes, Ltd.

(57) ABSTRACT

A cable guide includes a substantially cylindrical pipe section with a substantially outwardly projecting flange at one end. A channel is formed in the outside surface of the pipe section and extends from a first point at one end of the cable guide to a second point at the other end of the pipe section and further extends through the flange. The two opposite ends of the channel are located at different positions around the circumference of the pipe section. The channel is sized and configured to provide a passage for accommodating a cable. The channel forms a ridge on the inside surface of the pipe section which is shaped so as to minimize the disturbance to the flow of waste water through the cable guide and, therefore, to decrease the likelihood of blockages occurring.

19 Claims, 15 Drawing Sheets

(56) References Cited

U.S. PATENT DOCUMENTS

| | | | |
|---|---|---|---|
| 5,503,369 A * | 4/1996 | Frost et al. | 254/134.3 FT |
| 5,570,723 A * | 11/1996 | Hwang et al. | 138/111 |
| 6,220,079 B1 | 4/2001 | Taylor et al. | |
| 7,419,136 B2 * | 9/2008 | Martinez | 254/134.3 FT |
| 2006/0210750 A1 | 9/2006 | Morrow et al. | |
| 2010/0243096 A1 | 9/2010 | Berglund et al. | |
| 2013/0105024 A1 * | 5/2013 | Thomas et al. | 138/111 |

FOREIGN PATENT DOCUMENTS

| | | |
|---|---|---|
| GB | 2124728 A | 2/1984 |
| GB | 2462533 A | 2/2010 |
| WO | 0006933 | 2/2000 |
| WO | 2011070377 A2 | 6/2011 |

* cited by examiner

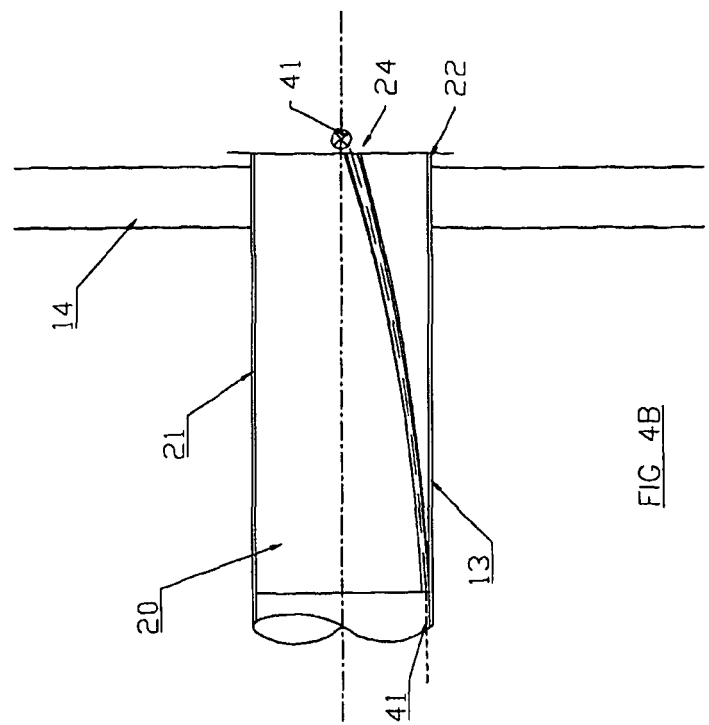
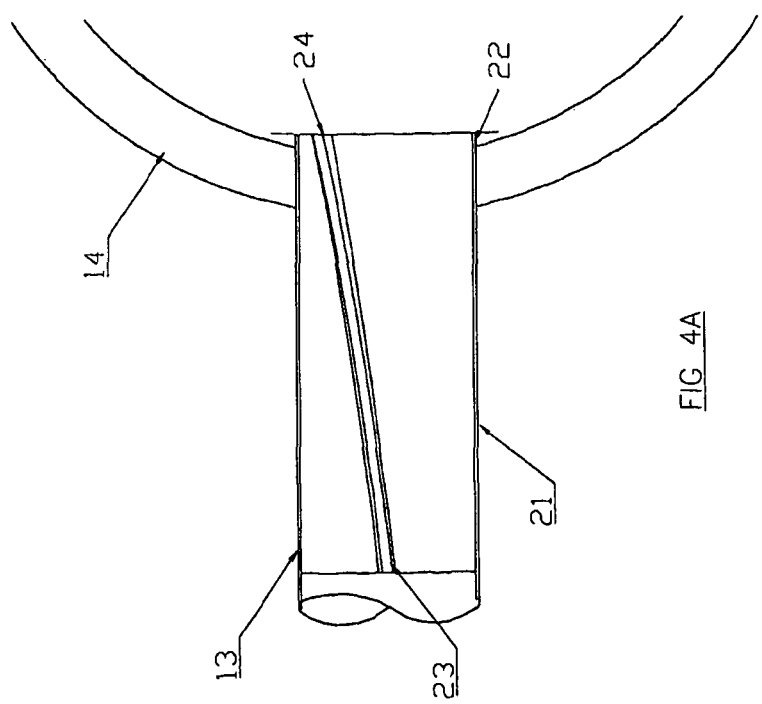
FIG. 4A
FIG. 4B

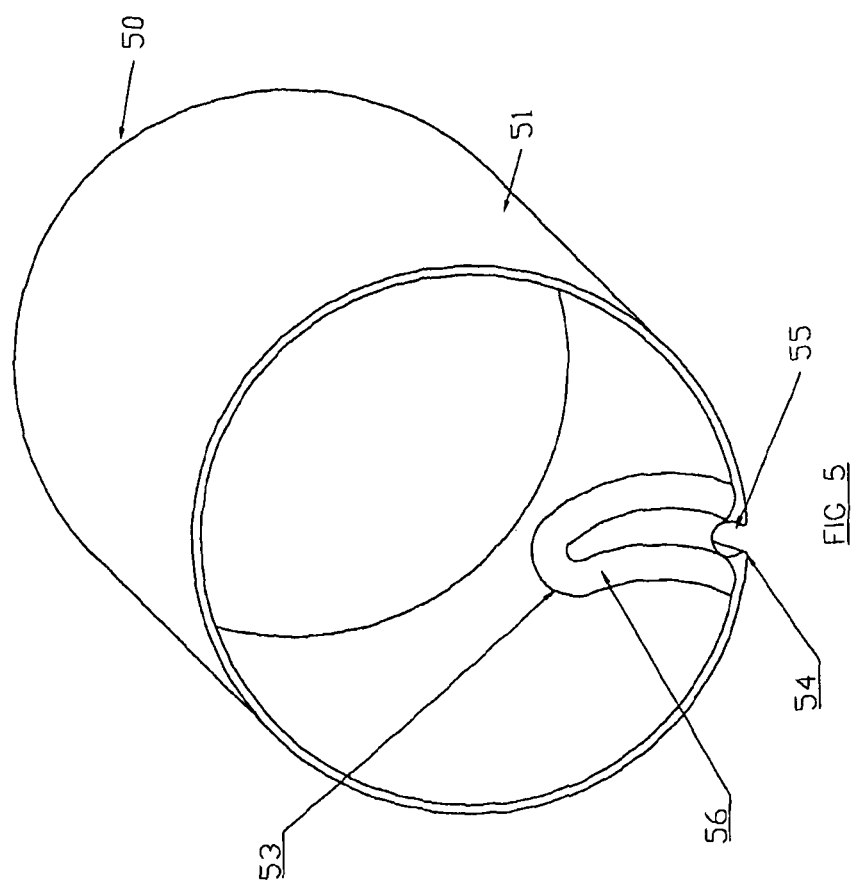

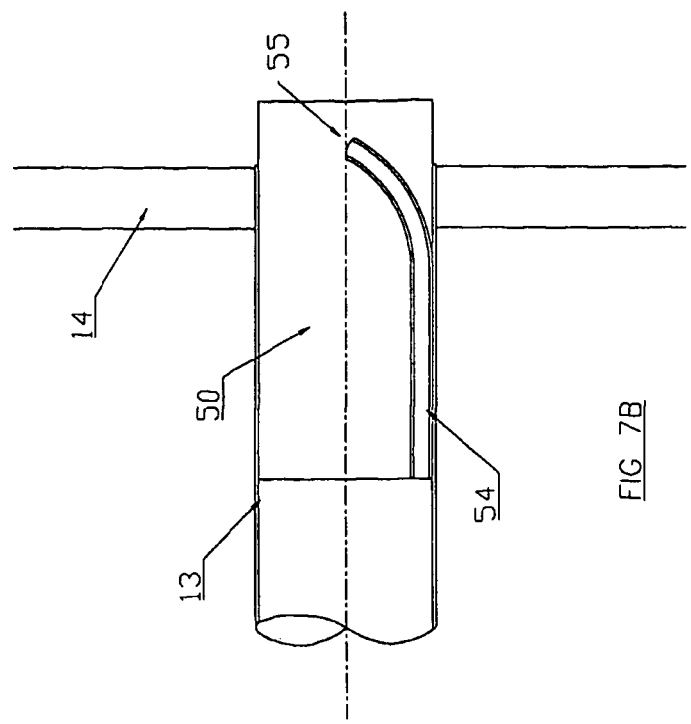
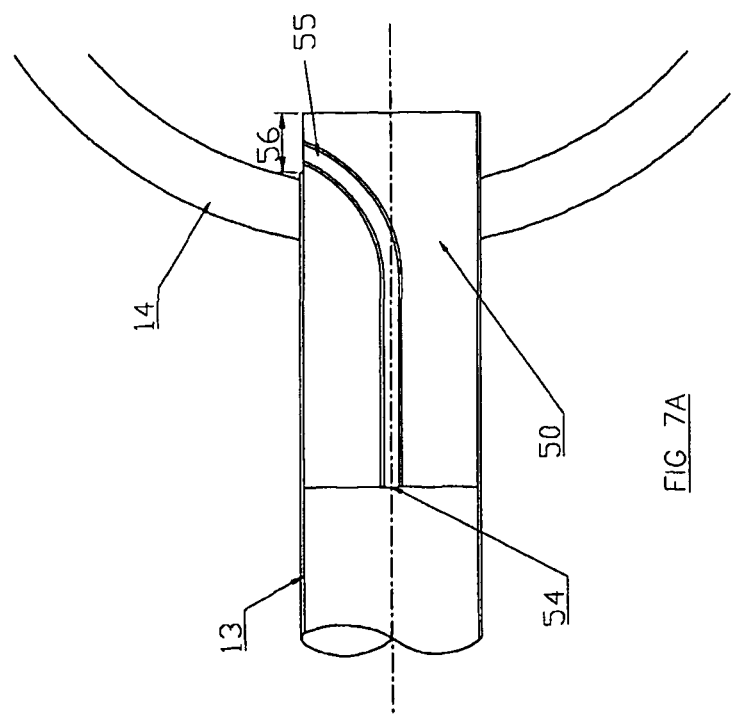

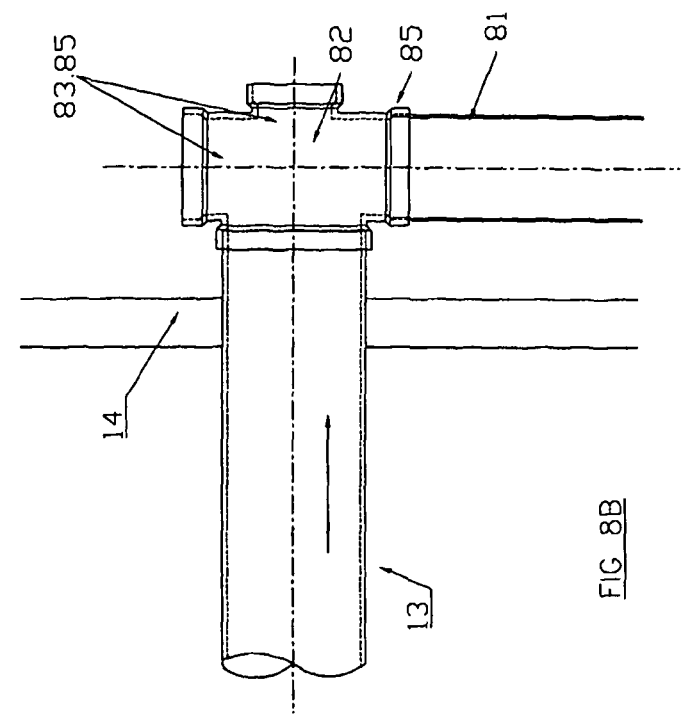
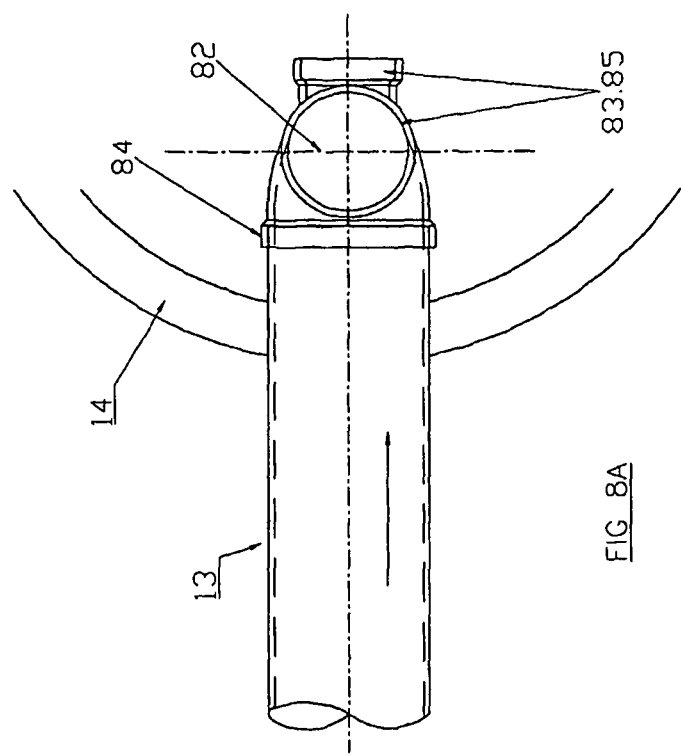

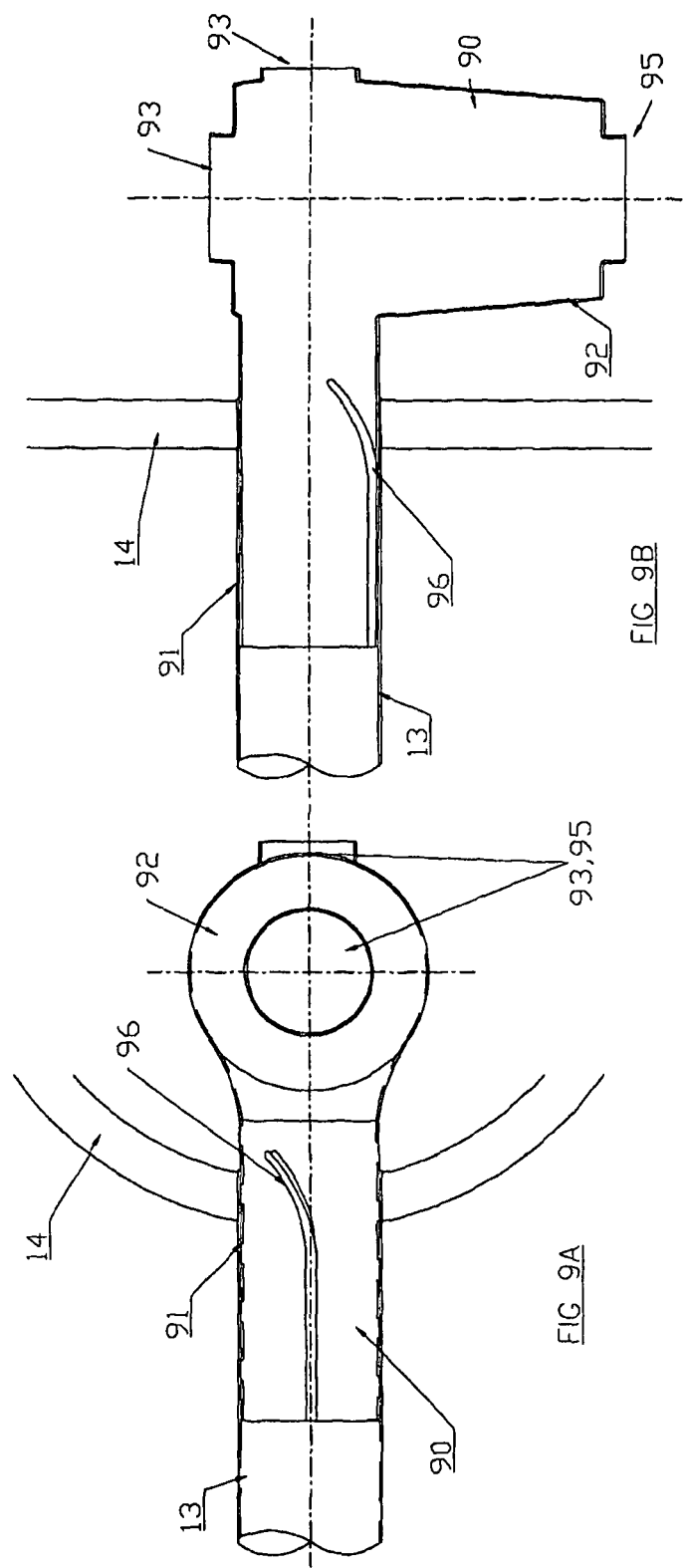

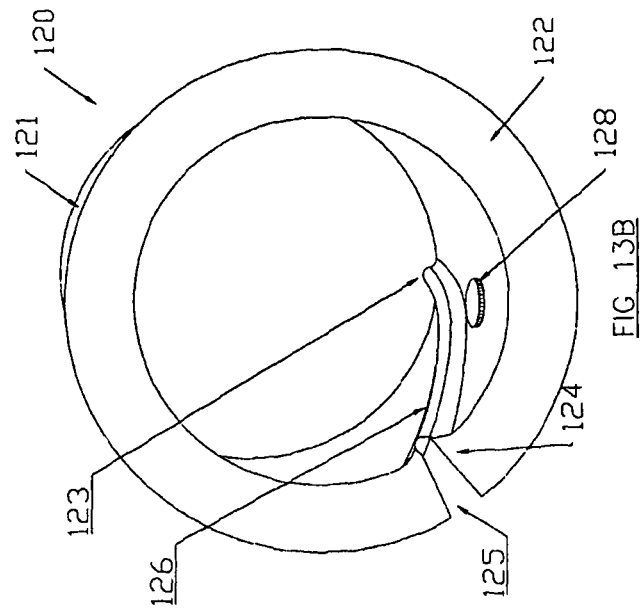
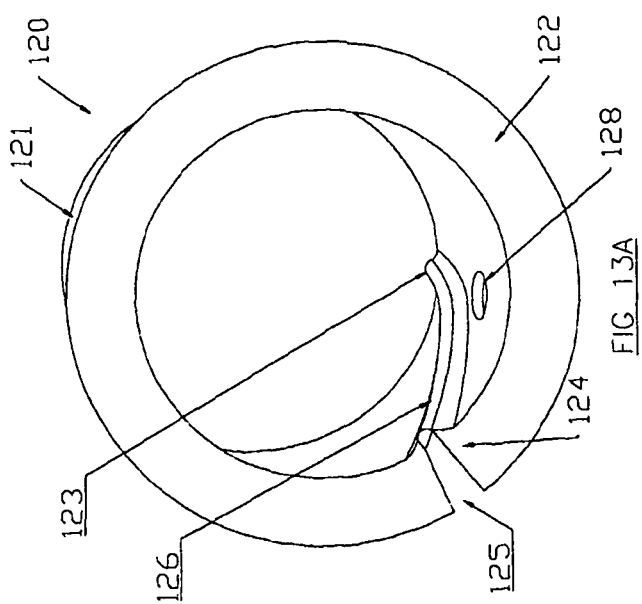

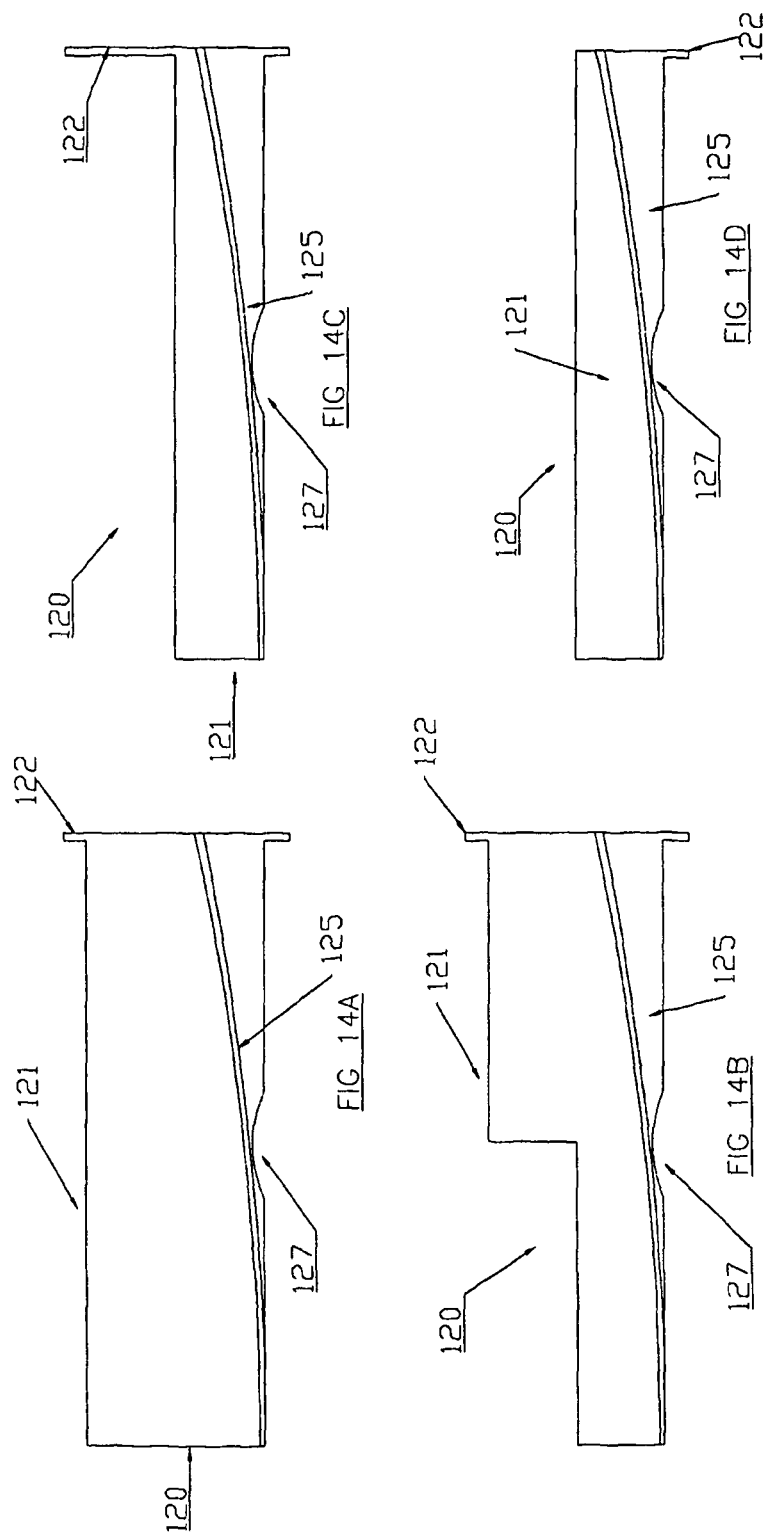

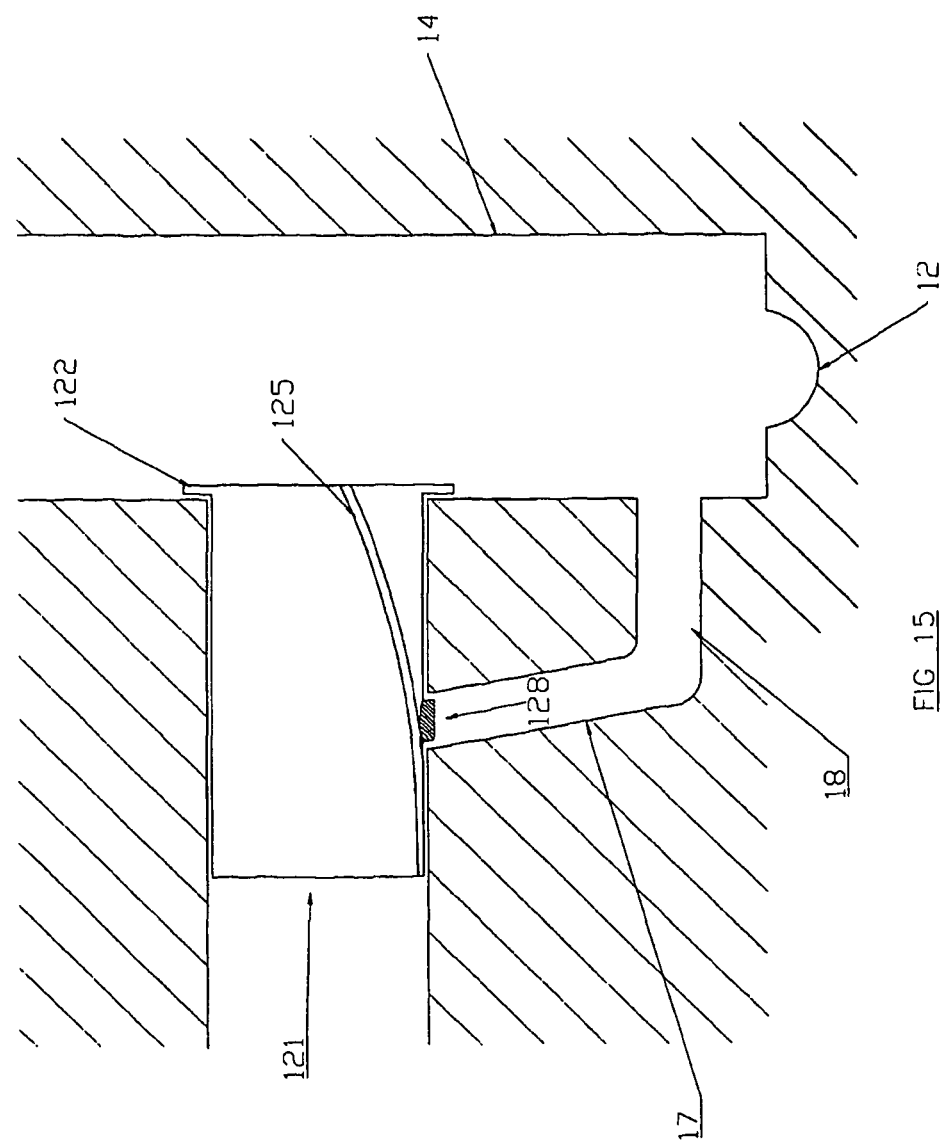

CABLE GUIDE

The present invention relates to a cable guide for use where cables are laid in pipes suitable for carrying fluids, which may or may not contain solids in suspension. Particularly, but not exclusively, it relates to a cable guide suitable for use in a pipe carrying both waste water and a cable which minimises the chances that the cable will cause blockages.

It is often necessary to lay networks of cables of various types, for example fibre optic cables, over large distances and in order to ensure that the cables remain undamaged such networks of cables are preferably laid under ground. However, it can be very expensive to construct the necessary infrastructure of tunnels to house such a network of cables. Therefore, as is already known in the art, it is convenient to lay cables in a pre-existing network of pipes, for example a waste water network, rather than building dedicated conduits.

The cables may be fixed to any part of the waste water pipes, for example they may be attached to the top of the pipes so as to minimise the likelihood of the cables causing the pipes to rag or block. Since such an installation is complicated, and therefore costly, it is more desirable to simply place the cables at the bottom of the pipe or flow channel of a pipe which avoids these complications. However, the cables must enter and leave the pipe or flow channel and at these points there will an increased chance of the cables creating blockages as the cables traverse the waste water flow. In the cases of flow in a single waste water pipe comprising a flow channel or flow in a network of interconnected pipes comprising a plurality of interconnected flow channels at the same height, a solution to this problem has been proposed in our co-pending application WO2008/009964.

However, it may be desirable to utilise a waste water pipe network, or indeed any network of interconnected pipes, wherein the pipes are of different sizes and at different levels at the point at which they meet. For example, a network may comprise a main waste water pipe with a flow channel which is joined by one or more inlet pipes via vertical manhole chambers so that the bottoms of the inlet pipes are at a higher level than the flow channel of the main waste water pipe. At the ends of these inlet pipes, the waste water drops down through the manhole chamber and into the main flow channel either directly or through a drop pipe whose axis is substantially perpendicular to the inlet pipe hanging within the manhole chamber. This arrangement is known as a front drop or internal backdrop. If a cable is laid along the inlet pipe and drops down into the main flow channel at end of the inlet pipe or via the drop pipe there is an increased chance of blockage at these areas.

In order to alleviate this problem, in instances where drop pipes are used, the joint between the inlet pipe and the drop pipe is often provided with rodding points, which are accessible from a manhole cover and which can be used to introduce rods into the joint to free collected debris. However, the introduction of such rods may cause damage to any cables which run through the joint.

In a further example of a network where a main waste water pipe with a flow channel which is joined by one or more inlet pipes via vertical manhole chambers so that the bottoms of the inlet pipes are at a higher level than the flow channel of the main waste water pipe, the inlet pipe may be provided with an external back drop pipe separate from and before the inlet pipe meets the manhole chamber. At the bottom of this back drop pipe a secondary inlet pipe is provided connecting the back drop pipe with the manhole chamber. Typically, said secondary inlet pipe will enter the manhole chamber above or at the same level as the main waste water pipe. In such a back drop arrangement the back drop pipe and the second inlet pipe facilitate the removal of built up debris by rodding. As before, if the cable should enter the joint between the inlet pipe and the back drop pipe (or indeed the joints between the back drop pipe and the secondary inlet pipe or the secondary inlet pipe and the manhole chamber) it can produce an increased risk of snagging and blockage. Additionally, as previously addressed, the introduction of rods into the back drop pipe or the secondary inlet pipe may result in damage to the cable.

It is an object of embodiments of the present invention to address these problems.

According to a first aspect of the present invention there is provided a cable guide comprising: a pipe section and a passage defined in the pipe section, the passage extending from a first point on a surface of the pipe section to a second point on a surface of the pipe section.

The cable guide of the present invention may thus enable a cable lying in the flow channel of a pipe to exit the flow channel prior to a pipe junction. This can thus avoid the increased risk of snagging or blockage presented by a cable lying in the flow channel at a junction.

The pipe to which the cable guide is fitted may be a waste water pipe or may be a pipe in any domestic, industrial or municipal effluent or waste water drainage system including but not limited to sewers for domestic soil, roadside drains, storm drains or similar. A cable may be accommodated by the passage while fluids and/or suspensions of solids in fluids, for example waste water, may flow through the pipe. Preferably, the passage is of a suitable shape so as not to substantially affect the flow of fluids and/or suspensions of solids in fluids through the pipe.

The passage may be a bore but is preferably a channel. The channel may be provided on an inside surface of the pipe section but is preferably provided on an outside surface of the pipe section. If necessary, to provide a passage of sufficient size to accommodate a cable, the channel may be associated with a corresponding ridge on the opposite surface of the pipe section. If the ridge is on the inside surface of the pipe section, the ridge may be adapted to have a smooth profile. This can reduce the associated risk or snagging or blockage.

In a preferred embodiment, the first point is at or proximate to a first end of the pipe section and the second point is at or proximate to the other end of the pipe section.

Preferably, the first and second points are disposed at different positions on the perimeter of the cross section of the pipe section. Preferably, in use, the first point is arranged to be substantially at the bottom of the pipe section and the second point is arranged to lie above the first point. When arranged in this manner, the second point may be arranged on either side of the pipe section relative to the first point and at any height relative to the first point as is desired and or required.

The pipe section may be substantially cylindrical. Alternatively, the pipe section may be substantially part or semi cylindrical in form. In further embodiments, the pipe section may comprise both a cylindrical section and a part or semi cylindrical section. Whilst the pipe section typically has a substantially circular cross-section, in further embodiments, the pipe section may have a substantially ovoid or other shaped cross-section.

The cable guide may be adapted for insertion into a pipe. This may be by matching the curvature of the outside surface of the pipe section to the curvature of the inside surface of the pipe to which it is fitted. The cable guide may be retained in position within the pipe by use of a suitable adhesive, such as an epoxy resin or similar. Preferably, the adhesive is adapted to cure within a time period of say, 72 hours or less. Most preferably, the adhesive is adapted to cure within a time period of say, 15 minutes or less. Advantageously, the adhesive is adapted to cure in the presence of water. Alternatively, the cable guide may be secured in position by means of suitable fixing means. The suitable fixing means may comprise bolts, screws, nails or similar driven into the wall of the pipe.

One end of the pipe section may be provided with a tapered edge. Such a tapered edge offers the advantage that once the cable guide is inserted into a pipe fluid and/or waste water flow within the pipes are presented with the tapered edge, rather than a hard step. This can minimise the disturbance to the fluid/waste water flow caused by the cable guide and hence reduce the risk of snagging or blockage.

In a further additional or alternative adaption, one end of the pipe section may be provided with a substantially outwardly projecting flange. The flange may abut the end of the pipe. This can prevent over insertion of the cable guide. Additionally, the flange can help to guide flow out of the end of the pipe rather than into the gap between the cable guide and the pipe.

The cable guide may further comprise or be adapted to attach to a connector unit. The connector unit may be adapted to connect one or more pipes to the cable guide. Such additional pipes may include a drop pipe. The connector unit may further comprise one or more rodding points. These may facilitate the removal of matter causing blockages within either the pipe section of the cable guide and/or the connected pipes, by inserting rods.

The cable guide may be provided with an opening in the pipe section. The opening may allow fluid and/or suspended particulate matter to flow into a back drop pipe. The positioning of the passage may be adapted such that it passes to one side or other of the opening. The opening may be provided with a rim. In use the rim may be adapted to project into the backdrop pipe. This can guide flow from the cable guide into the back drop pipe rather than into the gap between the cable guide and the pipe. The rim may be comprised of flexible material or be connected to the pipe section by a flexible material. In particular the rim may be adapted to flex from a position wherein it projects in to the pipe section to a position wherein it points out of the pipe section. In this manner, the rim can project into the pipe section whilst the cable guide is inserted into a pipe and may then be flexed into the outward position once the opening is positioned over the back drop pipe.

The cable guide may be formed from any material suitable for resisting decomposition by chemical or biological agents likely to be present within the sewer effluents such as oils, acids and other substances. Typically such material might include ceramics, stainless steel or plastics including but not limited to Polyvinyl Chloride, Polypropylene or Glass Reinforced Plastic.

According to a second aspect of the present invention there is provided a network comprising: one or more cables laid along the flow channels of pipes; and one or more cable guides according to the first aspect of the present invention provided at pipe junctions.

The network of the second aspect of the present invention may incorporate any or all of the features described in relation to the cable guide of the first aspect of the invention as desired or as appropriate.

Preferably, a cable guide according to the first aspect of the present invention is provided at each front drop or back drop junction.

The network can be used for any data. The cables within the network may be adapted to carry electrical or optical data signals and may thus be electrical data cables or fibre optic cables as required.

According to third aspect of the present invention there is provided a method of installing a cable guide in accordance with the first aspect of the present invention in a pipe, the method comprising the steps of: inserting the cable guide into a pipe; and positioning the cable guide at a desired location within the pipe.

The method of the third aspect of the present invention may incorporate any or all of the features described in relation to the cable guide of the first aspect of the invention or the network of the second aspect of the present invention as desired or as appropriate.

The method of installation may also include the step of fixing the cable guide in position. The fixing step may be achieved by the use of a suitable adhesive or by the use of suitable fixing means. The cable may be passed through the cable guide prior to or after installation is complete. In embodiments with a rim, the method may comprise the additional step of flexing the drop rim to project out of the cable guide. According to a fourth aspect of the present invention there is provided a method of laying a cable network incorporating at least one cable lying in the flow channel of a pipe comprising the steps of: laying a cable in the flow channel of a pipe; installing a cable guide according to the first aspect of the present invention at pipe junctions; and passing the cable through the cable guide.

The method of the fourth aspect of the present invention may incorporate any or all of the features described in relation to the cable guide of the first aspect of the invention, the network of the second aspect of the present invention or the method of the third aspect of the present invention as desired or as appropriate.

The skilled man will appreciate that the cable may be passed through the cable guide either prior to or after installation.

In order that the invention can be more clearly understood embodiments thereof are now described further below, by way of example, with reference to the accompanying drawings, of which:

FIG. 4A shows the plan view of FIG. 3A with a cable guide according to the present invention installed;

FIG. 4B shows the section view of FIG. 3B with a cable guide according to the present invention installed;

FIG. 5 is a perspective view of a second embodiment of a cable guide according to the present invention;

FIG. 7A shows the plan view of FIG. 6A with a cable guide according to the present invention installed;

FIG. 7B shows the section view of FIG. 6B with a cable guide according to the present invention installed;

FIG. 8A is a plan view of the junction between an inlet pipe and drop pipe;

FIG. 8B is a section view the junction between an inlet pipe and drop pipe;

FIG. 9A shows the plan view of FIG. 8A with a cable guide incorporating a connector unit according to the present invention installed;

FIG. 9B shows the section view of FIG. 8B with a cable guide incorporating a connector unit according to the present invention installed;

FIG. 13A is a first perspective view of an embodiment of a cable guide suitable for use with a back drop junction according to the present invention;

FIG. 13B is a second perspective view of an embodiment of a cable guide suitable for use with a back drop junction according to the present invention;

FIG. 14A is a side view of the cable guide of FIGS. 13a and 13b;

FIG. 14B is a side view of an alternative embodiment of a cable guide suitable for use with a back drop junction according to the present invention;

FIG. 14C is a side view of another alternative embodiment of a cable guide suitable for use with a back drop junction according to the present invention;

FIG. 14D is a side view of a further alternative embodiment of a cable guide suitable for use with a back drop junction according to the present invention; and FIG. 15 shows a section view of the cable guide of FIGS. 13a and 13b installed in a back drop junction.

Figure 1:
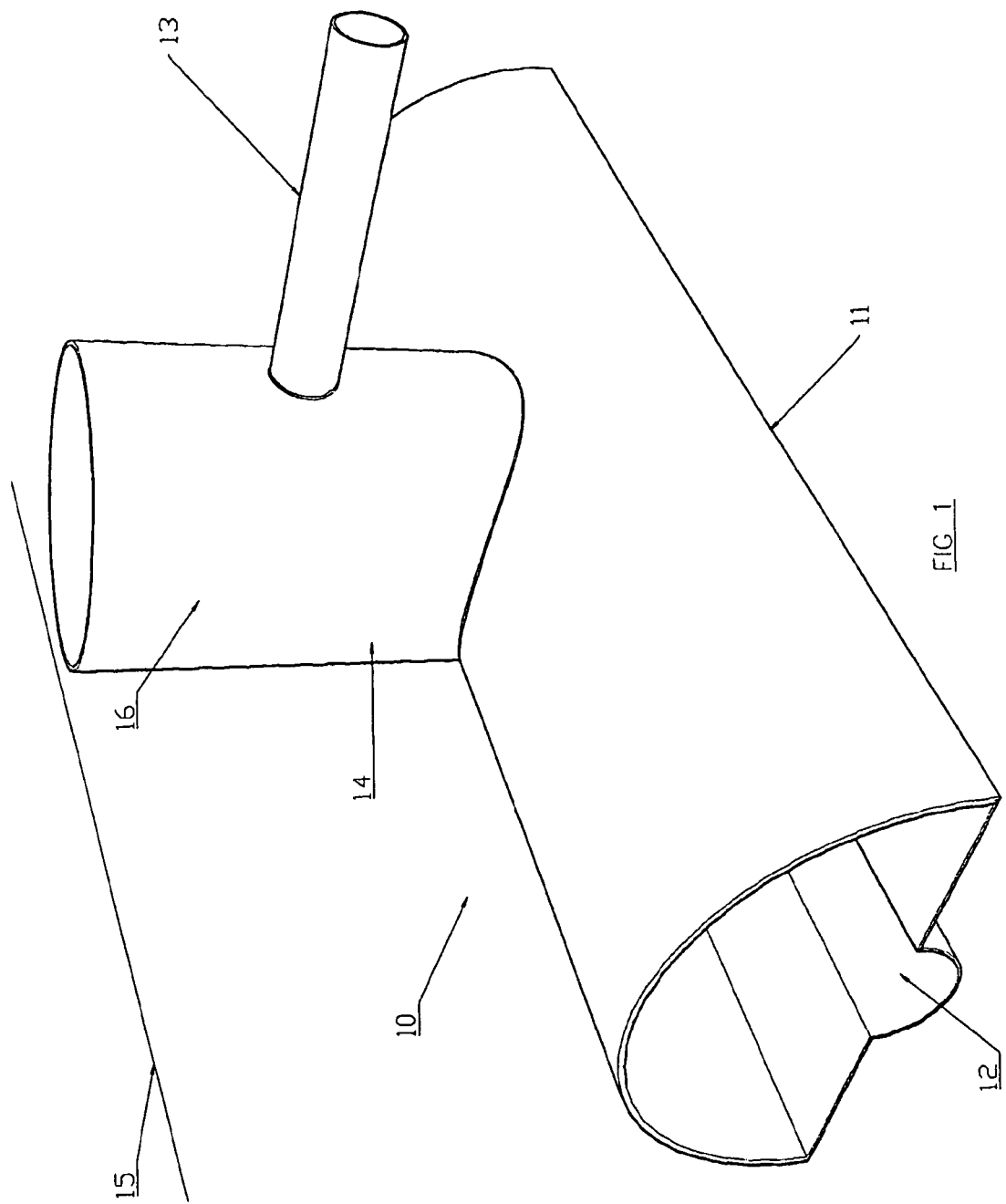
FIG. 1 is a schematic representation of a waste water network having a front drop junction in which a cable guide according to the present invention may be employed.

Referring to FIG. 1, a network of pipes 10 along which it is desirable to lay cables is shown. By using a cable guide (not shown) according to the present invention, the risk of cables laid along such a network of pipes 10 causing a blockage is reduced.

The network of pipes 10 comprises: a main waste water pipe 11 with a flow channel 12 and an inlet pipe 13. The main waste water pipe 11 and the inlet pipe 13 are connected via a manhole chamber 14, allowing waste water to flow along the inlet pipe 13, down the manhole chamber 14 and into the main waste water pipe 11 to flow along the flow channel 12. The manhole chamber 14 may extend up to ground level 15 and may be covered by a manhole cover 16.

Figure 2:
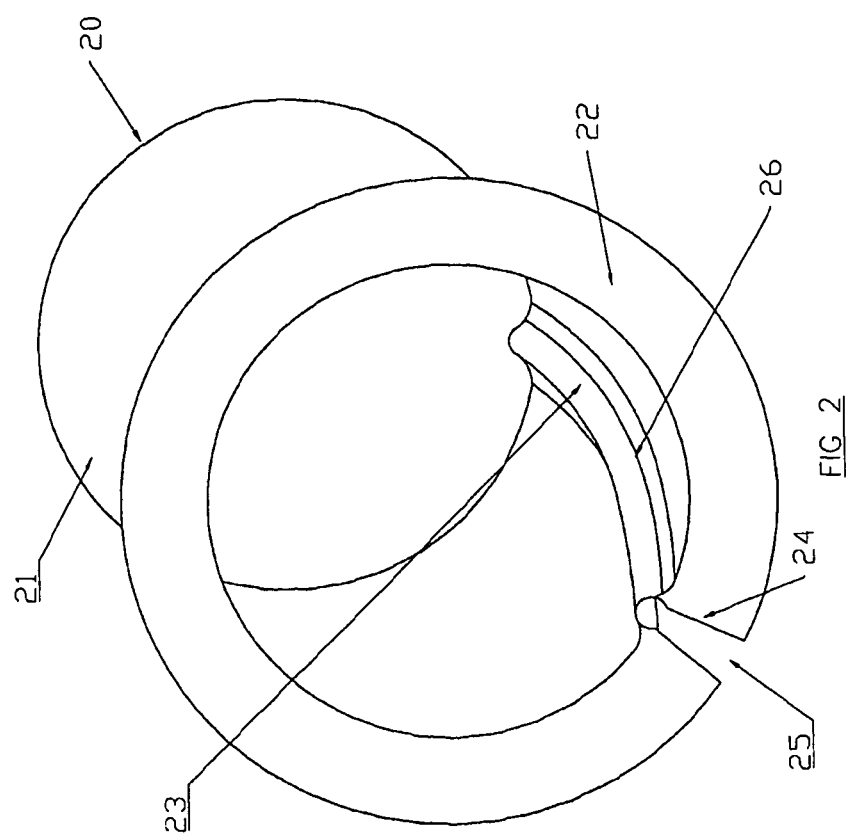
FIG. 2 is a perspective view of a first embodiment of a cable guide according to the present invention.

In order to lay a cable along the inlet pipe 13, down the manhole chamber 14 and then along the flow channel 12, a cable guide 20 according to the present invention, as shown in FIG. 2, may be utilised. In the embodiment shown in FIG. 2, the cable guide comprises a substantially cylindrical pipe section 21 with a substantially outwardly projecting flange 22 at one end. A channel 25 is formed in the outside surface of the pipe section 21 and extends from a first point 23 at one end of the cable guide to a second point 24 at the other end of the pipe section 21 and further extends through the flange 22. The two opposite ends of the channel are located at different positions around the circumference of the pipe section 21. The channel 25 is sized and configured to provide a passage for accommodating a cable (not shown). The channel 25 forms a ridge 26 on the inside surface of the pipe section 21 which is shaped so as to minimise the disturbance to the flow of waste water through the cable guide and, therefore, to decrease the likelihood of blockages occurring.

Figure 3B:
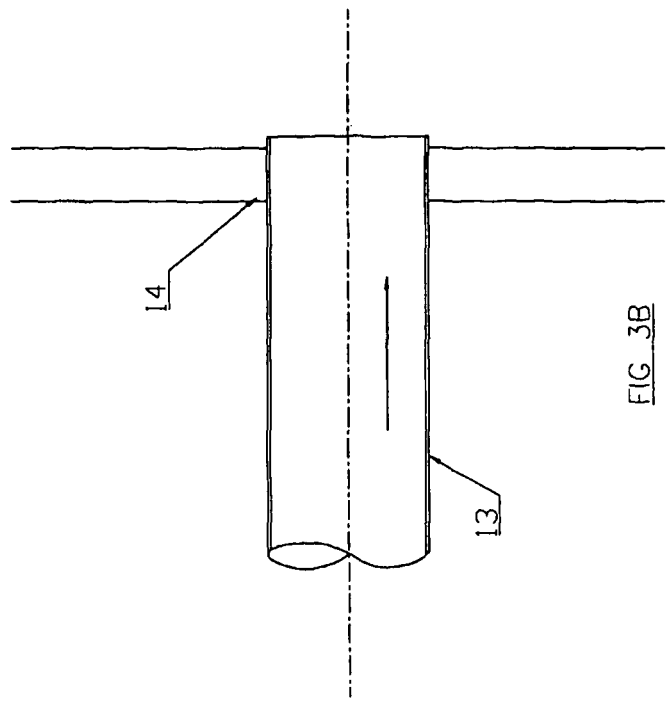
FIG. 3B is a section view of the junction between an inlet pipe and a manhole chamber.
Figure 3A:
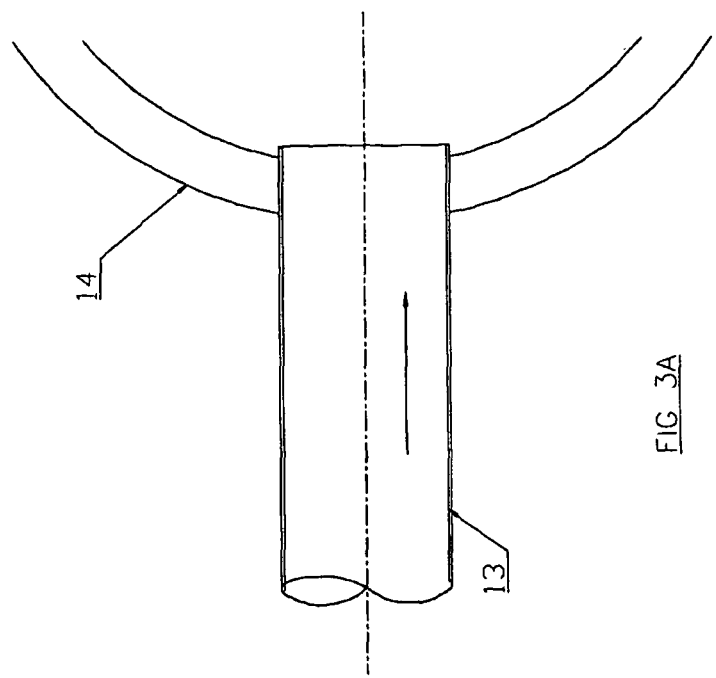
FIG. 3A is a plan view of the junction between an inlet pipe and a manhole chamber.
Figure 6B:
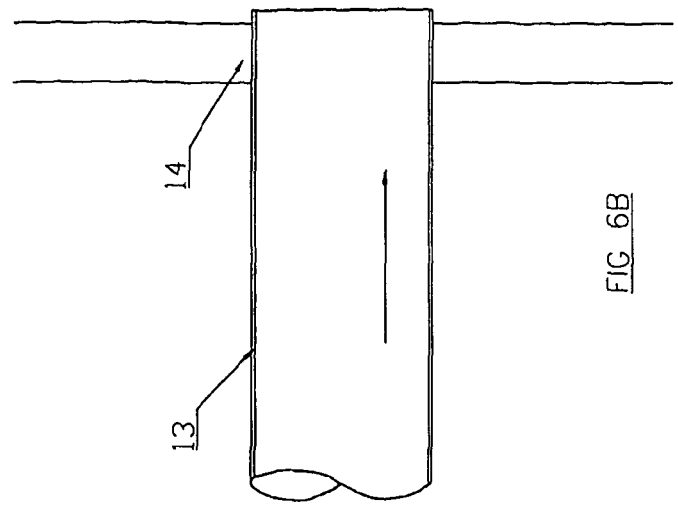
FIG. 6B is a section view of the junction between an inlet pipe and a manhole chamber.
Figure 6A:
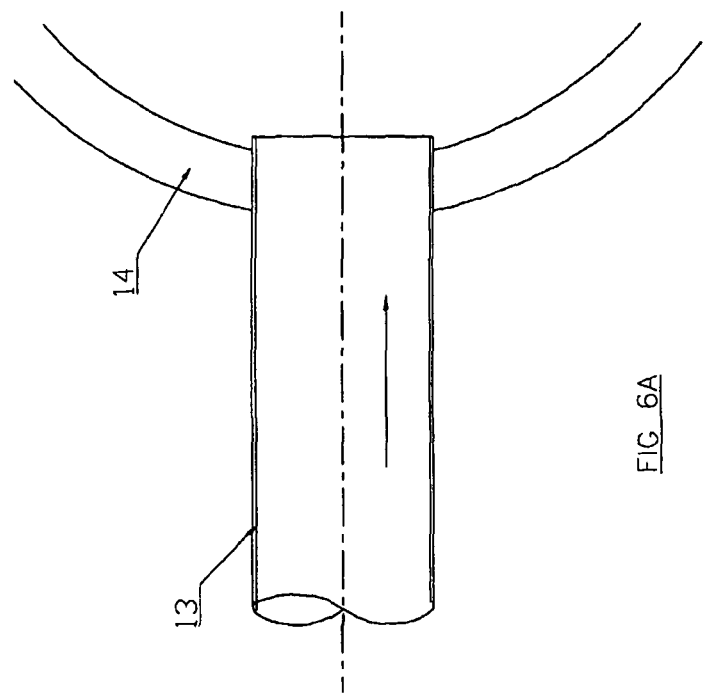
FIG. 6A is a plan view of the junction between an inlet pipe and a manhole chamber.

FIGS. 3A and 3B show a plan view and a section view of the junction between the inlet pipe 13 and the manhole chamber 14 respectively. As shown in FIGS. 4A and 4B, the cable guide according to the present invention is, in use, inserted into the inlet pipe 13 so that the flange 22 is in contact with the side of the manhole chamber and a cable 41 (shown as a broken line) is accommodated by the channel 25 (see FIG. 4B).

Since the channel 25 connects two points which correspond to two different positions on the circumference of the pipe section 21, the cable may be moved from one circumferential position to another. The first point 23 is substantially aligned with the bottom point of the inlet pipe 13. The cable runs through the channel 25 and therefore enters the manhole chamber 14 at the second point 24, which is above the first point 23 and therefore is not in the main flow of waste water. Whilst the ridge formed in the inner surface of the pipe section 21 by the channel 25 traverses the main flow of waste water, it suitably shaped so as to minimise the disturbance to the flow of waste water through the cable guide. The cable may then be run down the manhole chamber 14 and along the main waste water pipe 11 by any suitable method.

There may be provided two different types of cable guide 20, a right-handed version as shown in FIG. 2 and a left-handed version, which is a mirror image of the cable guide 20 shown in FIG. 2. This allows for the possibility of causing the cable to exit to either side of the main flow. Furthermore, for each handedness, several different versions of the cable guide 20 may be provided which differ in the relative circumferential positions of the first and second points 23, 24.

Referring to FIGS. 5, 6A, 6B, 7A and 7B, an alternative embodiment of a cable guide 50 according to the present invention is shown. This differs from the embodiment shown in FIG. 2 in that the cable guide 50 does not have a flange and that rather then extending from one end of the pipe to the other, the channel runs from one end of the cable guide 50 to a point on the side of the cable guide 50. Although proximate to the second end of the cable guide 50, the second point 54 is spaced 56 from the second end. This may further reduce the likelihood of blockages caused by the cable.

In a network of pipes 10 as shown in FIG. 1, it may be desirable for the inlet pipe 13 to be connected to a drop pipe 81 rather than allowing the waste water to fall through the manhole chamber 14 unconstrained. This is illustrated in FIGS. 8A and 813, which show plan and section views respectively of the junction between the inlet pipe 13 and the manhole chamber 14. The inlet pipe 13 is connected to a drop pipe 81 via a connector 82 having inlet 84 and outlet 85 apertures, to enable such connection. Furthermore, since such junctions are naturally more prone to blockages, the connector 82 may comprise one or more rodding points 83. These rodding points may be utilised to clear blockages, should they occur, by introducing rods (not shown) into the connector and they may be accessed via the manhole cover 16.

The use of such rods to clear blockages presents an additional complication to laying cables in waste water networks of this type as, whilst the rods may clear blockages they may also result in damage to the cables. Therefore, if possible it is desirable for cables laid in such waste water networks to bypass the area surrounding the rodding points 83.

In order to lay cables in situations where a drop pipe 81 and associated rodding points 83 are desired, a further embodiment of the present invention, as shown in FIGS. 9A and 9B, may be employed. As shown in FIGS. 9A and 9B, a cable guide 90 comprises a pipe section 91 and a connector unit 92.

There is a channel 95 extending from a first point 93 at one end of the pipe section 91 to a second point 94 at the other end of the pipe section 91.

As before, in use, the pipe section 91 is inserted into the inlet pipe 13. The pipe section 91 performs a similar role to the pipe sections of cable guides 20 and 50 described above. The main difference between the embodiment shown in FIGS. 9A and 9B and that shown in FIG. 5 is the addition of the connector unit 92.

The connector unit 92 comprises a connection point 95 to enable it to connect with the drop pipe 81. The connector unit 92 may further comprise one or more rodding points 93. These may be utilised to clear blockages, should they occur, by introducing rods (not shown) into the connector unit 92. The rodding points may be accessible via the manhole cover 16. Since, in use, the cable is accommodated in the channel 96, defined on the outside surface of the pipe section 91, the cable does not enter the body section 92 and, therefore, bypasses the region into which rods are likely to be introduced to remove blockages.

Such an arrangement would still be suitable for avoiding the aforementioned problem that the use of rods to clear blockages may result in damage to the cables whether or not the connector unit 92 is integral to cable guide 90.

Figure 10:
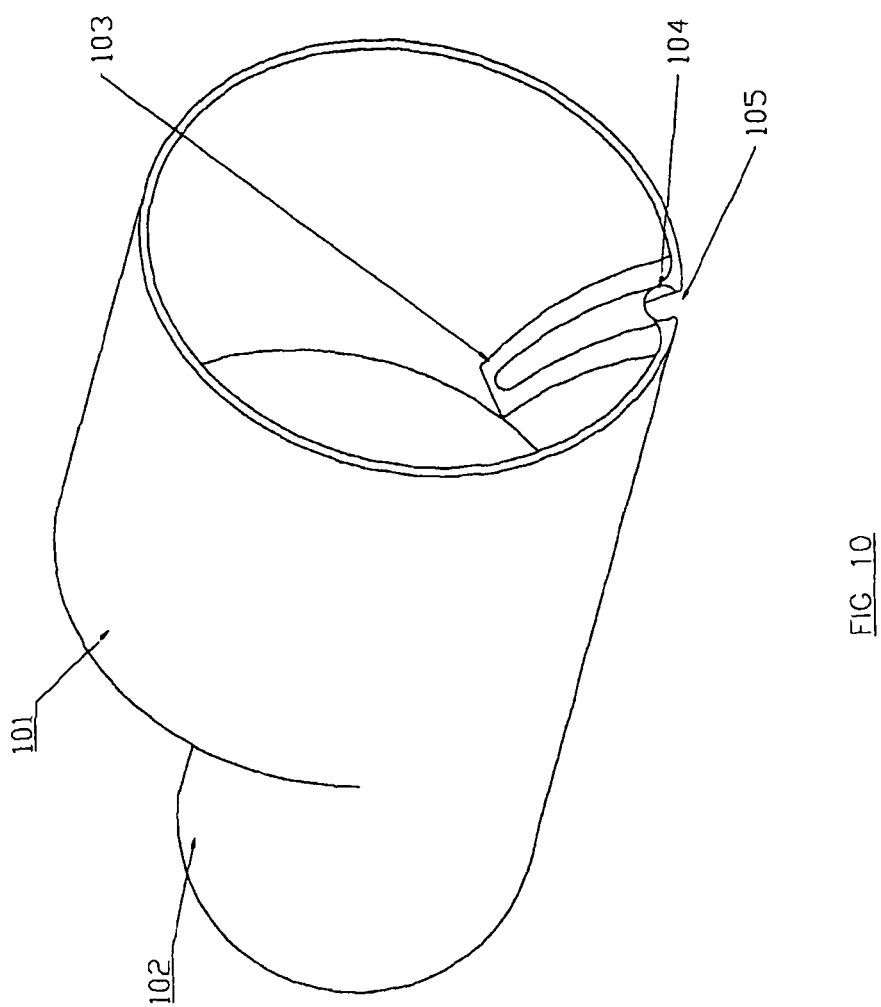
FIG. 10 shows a perspective view of a third embodiment of a cable guide according to the present invention.
Figure 11:
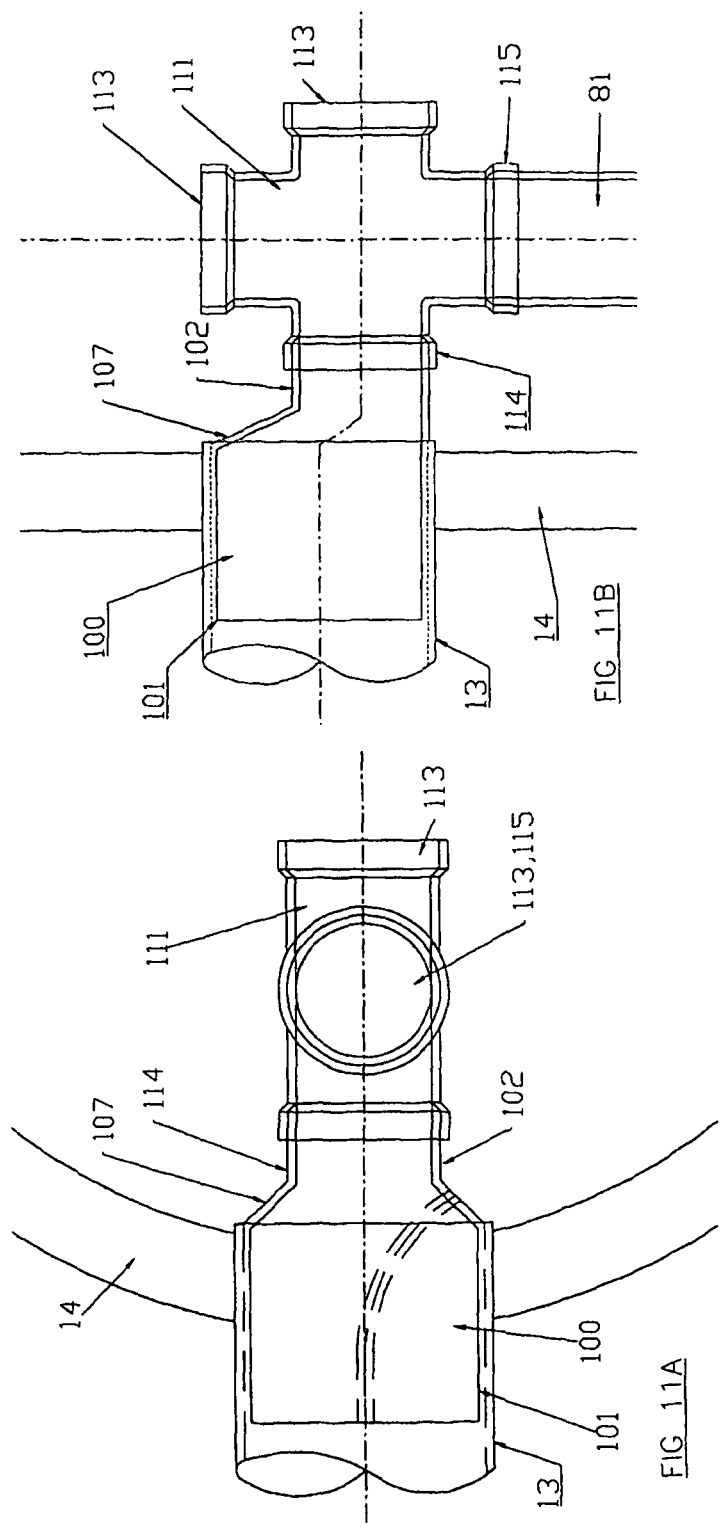
FIG. 11A shows the plan view of FIG. 8A with a cable guide according to FIG. 10 of the present invention installed.
FIG. 11B shows the section view of FIG. 8B with a cable guide according to FIG. 10 of the present invention installed.

An alternative solution to the problem of laying cables in situations where a drop pipe 81 is desired is offered by a further embodiment of the present invention, as shown in FIGS. 10, 11A and 11B. The difference between a cable guide 100 as shown in FIG. 10 and the cable guide 50 shown in FIG. 5 is that the cable guide 100 comprises a first pipe section 101 and a second pipe section 102 with a smaller diameter connected via an intermediate tapered section. The channel extends from a first point 103 at one end of the first section 101 to a second point 104 at the other end of the first section 101.

In use, the first section 101 of the cable guide 100 is inserted into the inlet pipe 13. The first point is arranged so that the first point 103 is aligned with the bottom of inlet pipe 13. Furthermore, the tapered section 107 is such that the bottom of the first section 101 is aligned with the bottom of the second section 102.

The second section 102 is operable to connect to a drop pipe 81 via a connector unit 111. The diameter of the second section 102 is therefore chosen to be of an appropriate size that the second section 102 can mate with an inlet aperture 114 of the connector unit 111.

In addition to the inlet and outlet apertures 114, 115 to enable the connection between the second section 102 and the drop pipe 81, the connector unit 111 may further comprise one or more rodding points 113. These may be utilised to clear blockages, should they occur, by introducing rods (not shown) into the connector. The rodding points may be accessed via the manhole cover 16.

Whilst each of the above embodiments of a cable guide 20, 50, 90, 100 has been shown to comprise a respective pipe section 21, 51, 91, 101, 102 having a substantially cylindrical form, other forms may be used if required or desired. For instance, the pipe sections 21, 51, 91, 101, 102 may be of substantially ovoid or other cross-section, to match the pipe to which they are fitted. Additionally or alternatively, some or all of the pipe sections 21, 51, 91, 101, 102 may be partial or half pipe sections; that is they may omit part of the circumferential wall of the pipe section 21, 51, 91, 101, 102 along at least part of their length. This can reduce the size, weight and cost of the cable guides 20, 50, 90, 100.

Figure 12:
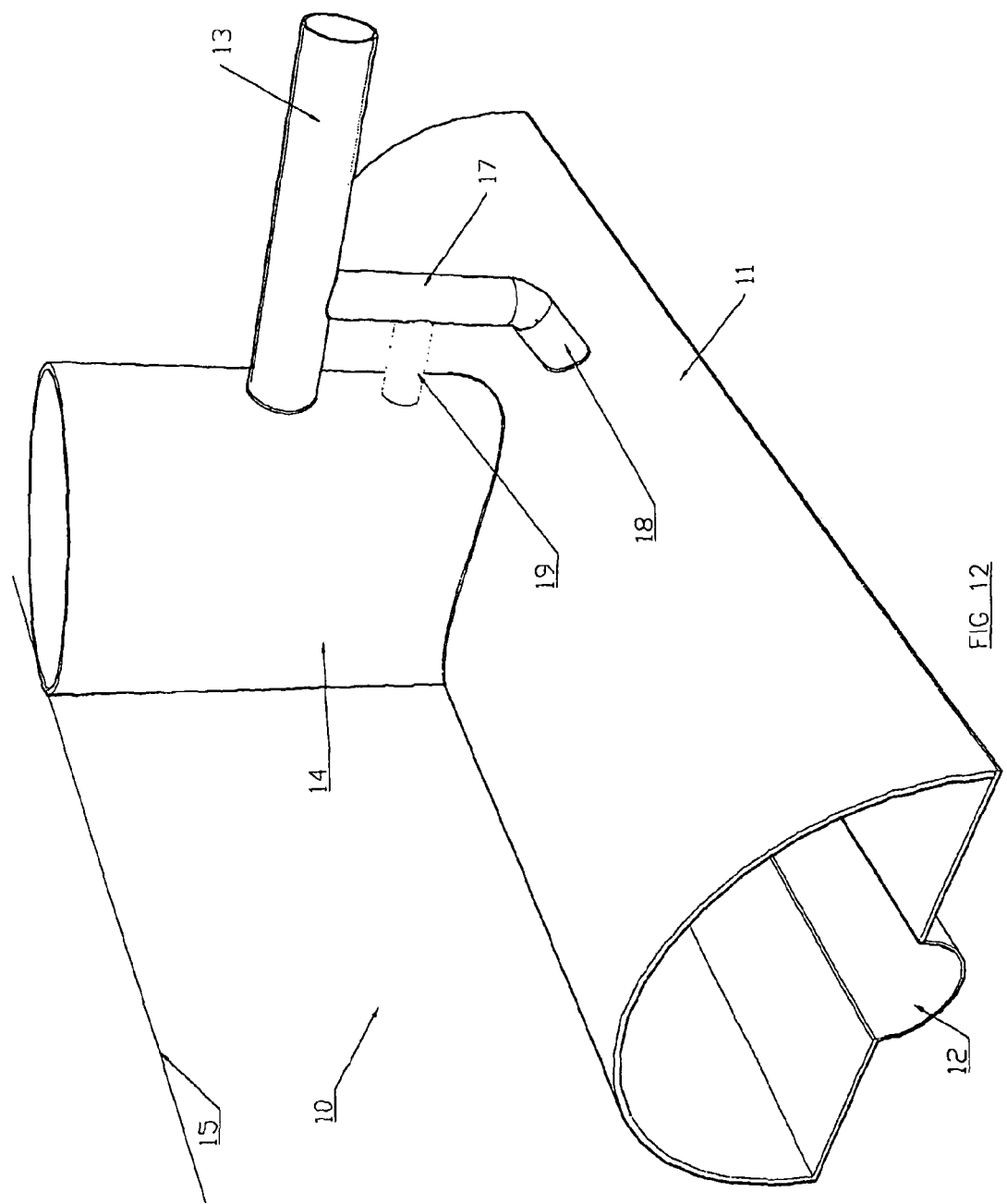
FIG. 12 is a schematic representation of a waste water network having a back drop junction in which a cable guide according to the present invention may be employed.

Referring to FIG. 12, a network of pipes 10 along which it is desirable to lay cables is shown. By using a cable guide (not shown) according to the present invention, the risk of cables laid along such a network of pipes 10 causing a blockage is reduced. In this instance, the network of pipes 10 comprises: a main waste water pipe 11 with a flow channel 12 and an inlet pipe 13. The main waste water pipe 11 and the inlet pipe 13 are connected to manhole chamber 14, by a back drop junction. This allows waste water to flow along the inlet pipe 13, down the back drop pipe 17 along the secondary pipe 18, into the main waste water pipe 11 to flow along the flow channel 12. Alternatively, but not commonly, a shorter secondary pipe 19 may be provided exiting into the main waste water pipe 12 via then into the manhole chamber 14. The manhole chamber 14 may extend up to ground level 15 and may be covered by a manhole cover 16. The provision of the back drop pipe 17 and secondary inlet pipe 18 allows for the ready removal of solid material near the junction by rodding.

In order to lay a cable along the inlet pipe 13, down the manhole chamber 14 and then along the flow channel 12, a cable guide 120 according to the present invention, as shown in FIG. 13A, may be utilised. In the embodiment shown in FIG. 13A, the cable guide comprises a substantially cylindrical pipe section 121 with a substantially outwardly projecting flange 122 at one end. A channel 125 is formed in the outside surface of the pipe section 121 and extends from a first point 123 at one end of the cable guide to a second point 124 at the other end of the pipe section 121 and further extends through the flange 122. The two opposite ends of the channel are located at different positions around the circumference of the pipe section 121. The channel 125 is sized and configured to provide a passage for accommodating a cable (not shown). The channel 125 forms a ridge 126 on the inside surface of the pipe section 121 which is shaped so as to minimise the disturbance to the flow of waste water through the cable guide and, therefore, to decrease the likelihood of blockages occurring.

The pipe section 121 also comprises an opening 127 adapted to match the size of and be positioned over the back drop pipe 17. The passage 125 is adapted to run to one side of the opening 127. The opening is also provided with a rim 128 which can project down into the back drop pipe 17 as is shown in FIG. 13A and FIG. 15. This can guide flow from the pipe section 121 into the back drop pipe 17 rather than into the gap between the pipe section 121 121 and the pipe 13. This rim 128 may also help to retain the cable guide 120 in position relative to pipe 13. Typically, the rim 128 is flexible and can be moved from a position shown in FIG. 13B where it projects into the pipe section 121 to a position shown in FIGS. 13A and 15 where it projects out of the pipe section 121 into back drop pipe 17. In this manner, the cable guide 120 can be readily inserted with the rim 128 projecting in and once in position, the rim 128 can be flexed to an outward projecting position.

Since the channel 125 connects two points which correspond to two different positions on the circumference of the pipe section 121, the cable may be moved from one circumferential position to another. The first point 123 is substantially aligned with the bottom point of the inlet pipe 13. The cable runs through the channel 125 and therefore enters the manhole chamber 14 at the second point 124, which is above the first point 123 and therefore is not in the main flow of waste water. Whilst the ridge formed in the inner surface of the pipe section 121 by the channel 125 traverses the main flow of waste water, it suitably shaped so as to minimise the disturbance to the flow of waste water through the cable guide. The cable may then be run down the manhole chamber 14 and along the main waste water pipe 11 by any suitable method.

There may be provided two different types of cable guide 120, a right-handed version as shown in FIG. 2 and a left-handed version, which is a mirror image of the cable guide 120 shown in FIG. 2. This allows for the possibility of causing the cable to exit to either side of the main flow. Furthermore, for each handedness, several different versions of the cable guide 120 may be provided which differ in the relative circumferential positions of the first and second points 123, 124.

It is also possible, as is shown in FIGS. 14A-14D for the pipe section 121 to comprise a full cylindrical section as shown in FIG. 14A or to comprise a mixture of a full cylindrical section 121a and a part or semi cylindrical section 121b as shown in FIG. 14B. In a third alternative, the whole of pipe section 121 may comprise a semi cylindrical section as shown in FIG. 14Cc. In another alternative, shown in FIG. 14D, both the pipe section 121 and the flange 122 may be of semi cylindrical form. It is also possible for the cable guide 120 to be adapted in line with the front drop cable guide variants 50, 100 of FIGS. 5 and 10 if required or desired.

It is of course to be understood that the invention is not to be restricted to the details of the above embodiments which have been described by way of example only.

The invention claimed is:

1. A cable guide comprising: a pipe section and a passage defined in a wall of the pipe section, the passage extending from a first point on a surface of the pipe section to a second point on a surface of the pipe section, and wherein one end of the pipe section is provided with a substantially outwardly projecting flange.

2. A cable guide as claimed in claim 1 wherein the passage is a channel provided on an outside surface of the pipe section.

3. A cable guide as claimed in claim 1 wherein the passage is associated with a corresponding ridge on the opposite surface of the pipe section.

4. A cable guide as claimed in claim 1 wherein the first point is at or proximate to a first end of the pipe section and the second point is at or proximate to the other end of the pipe section.

5. A cable guide as claimed in claim 4 wherein the first and second points are disposed at different positions on the perimeter of the cross section of the pipe section.

6. A cable guide as claimed in claim 4 wherein the first point is arranged to be substantially at the bottom of the pipe section and the second point is arranged to lie above the first point.

7. A cable guide as claimed in claim 1 wherein the pipe section is substantially cylindrical part cylindrical or semi cylindrical in form.

8. A cable guide as claimed claim 1 wherein one end of the pipe section is provided with a tapered edge.

9. A cable guide as claimed in claim 1 wherein the cable guide further comprises or is adapted to attach to a connector unit for connecting one or more pipes to the cable guide.

10. A cable guide as claimed in claim 9 wherein the connector unit further comprises one or more rodding points.

11. A cable guide as claimed in claim 1 wherein the cable guide is provided with an opening in the pipe section.

12. A cable guide as claimed in claim 11 wherein the positioning of the passage is adapted such that the passage passes to one side or other of the opening.

13. A cable guide as claimed in claim 11 wherein the opening is provided with a rim.

14. A cable guide as claimed in claim 13 wherein the rim is comprised of flexible material or is connected to the pipe section by a flexible material.

15. A network comprising:
one or more cables laid along the flow channels of pipes; and
one or more cable guides comprising a pipe section and a passage defined in a wall of the pipe section, the passage extending from a first point on a surface of the pipe section to a second point on a surface of the pipe section provided at pipe junctions and wherein one end of the pipe section is provided with a substantially outwardly projecting flange.

16. A method of installing a cable guide comprising a pipe section and a passage defined in a wall of the pipe section, the passage extending from a first point on a surface of the pipe section to a second point on a surface of the pipe section in a pipe, and wherein one end of the pipe section is provided with a substantially outwardly projecting flange, the method comprising the steps of:
inserting the cable guide into a pipe; and
positioning the cable guide at a desired location within the pipe.

17. A method as claimed in claim 16 which includes the step of fixing the cable guide in position.

18. A method as claimed in claim 16, wherein the cable guide further includes an opening with a flexible drop rim, and wherein the method comprises the additional step of flexing the drop rim to project out of the cable guide.

19. A method of laying a cable network incorporating at least one cable lying in the flow channel of a pipe comprising the steps of:
laying a cable in the flow channel of a pipe;
installing a cable guide comprising a pipe section and a passage defined in a wall of the pipe section, the passage extending from a first point on a surface of the pipe section to a second point on a surface of the pipe section at pipe junctions, and wherein one end of the pipe section is provided with a substantially outwardly projecting flange; and
passing the cable through the cable guide.

* * * * *